Figure 1:
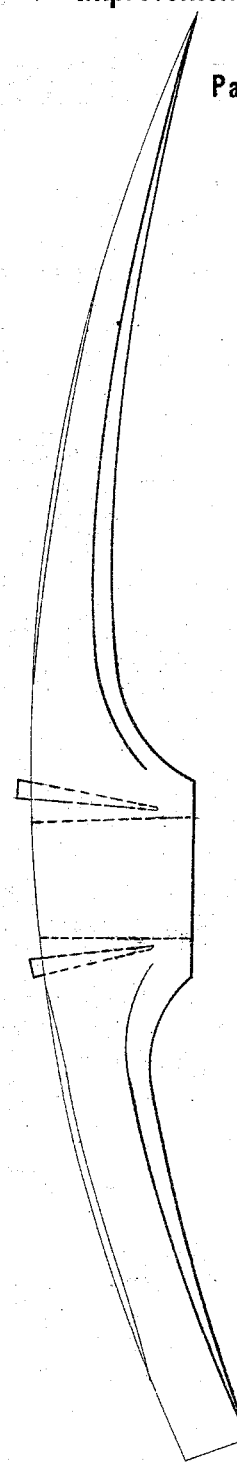

DANIEL McNALLY.
Improvement in the Manufacture of Picks and Rammers.
No. 120,658.
Patented Nov. 7, 1871.

UNITED STATES PATENT OFFICE.

DANIEL McNALLY, OF MOUNT SAVAGE, MARYLAND.

IMPROVEMENT IN THE MANUFACTURE OF PICKS AND RAMMERS.

Specification forming part of Letters Patent No. 120,658, dated November 7, 1871.

*To all whom it may concern:*

Be it known that I, DANIEL MCNALLY, of Mount Savage, in the county of Alleghany and State of Maryland, have invented a new and useful Improvement in Methods of Forming Eyes for Picks, Grubbing-Hoes, Rammers, and analogous articles; and I do hereby declare that the following is a full, clear, and exact description thereof, which will enable others skilled in the art to make and use the same, reference being had to the accompanying drawing forming part of this specification.

The invention consists in re-enforcing the eye of such tools as are liable to split in the direction of the laminations or grain of the metal, as hereinafter fully described and subsequently pointed out in the claim.

The rammer used upon railroads has more particularly come under my observation, and been found to split or break lengthwise thereof. To overcome this difficulty practical experience pointed out to me the necessity of some re-enforcements to the eye. After careful thought and experiment I have discovered a new method of effecting this object; and in order practically to exemplify and clearly set forth the method so that it may be readily practiced by those skilled in the working of iron, I will now describe and illustrate by the drawing a railroad-rammer.

Figure 2:
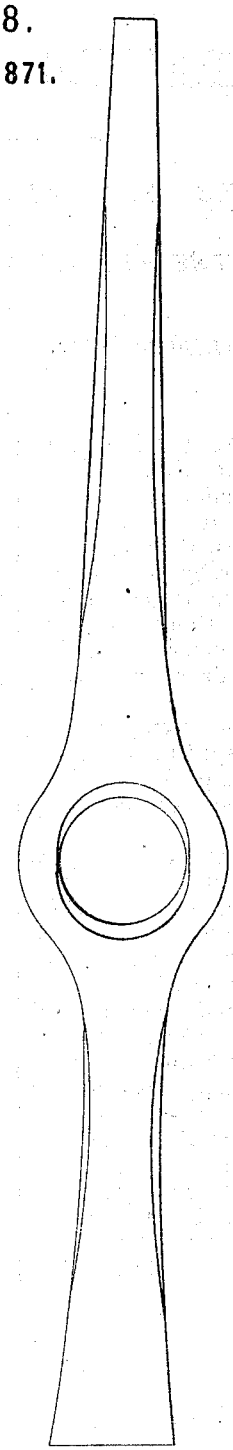
Figure 3:
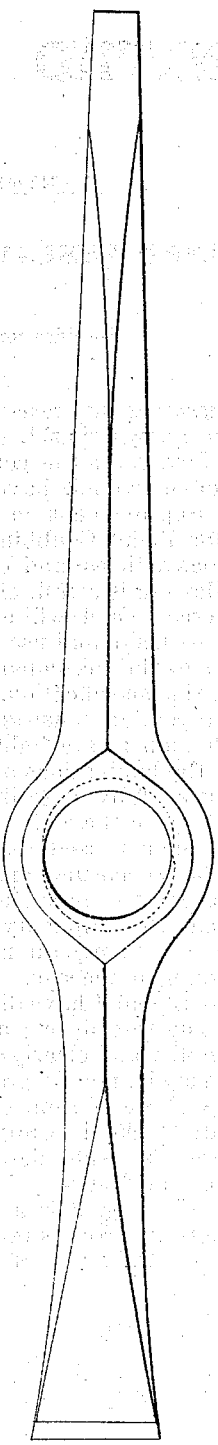

Figure 1 is a side view of a rammer with the eye after the first step in my method has been performed. Fig. 2 is a plan and front view of the tapering socket as produced after the second step of my method, or after the welding process, has been completed. Fig. 3 is my preferred form of elongated socket, by which I am able to make the tool lighter and thereby dispense with a considerable portion of the usual weight.

The opening in the bar-iron for the eye having been formed in the usual way, I punch one hole a little above and another a little below it, but transversely thereto, and across the grain of the metal, as seen in Fig. 1. These holes are preferably extended not quite through the blank. I then take wedges of flat bar-iron and place them in these apertures, with the grain at right angles to that of the blank, and weld the two firmly together, as shown in Fig. 2 of drawing. The eye is then finished on a mandrel or in any other suitable way, and, if desired, it is then chamfered to an elongated edge at top and bottom, as shown in Fig. 3 of drawing.

Having thus described all that is necessary to a full understanding of my invention, what I esteem to be new, and desire to secure by Letters Patent, is—

A method of re-enforcing the eye of picks, rammers, and analogous articles by welding a transverse piece of metal above and a like piece below said eye, and with its grain across that of said articles, as described, for the purpose of preventing them from cracking or splitting lengthwise thereof.

DANIEL McNALLY.

Witnesses:
JOHN J. CALLAGHAN,
JAMES P. CALLAGHAN. (49)